United States Patent [19]

Itoh

[11] Patent Number: 5,867,567
[45] Date of Patent: Feb. 2, 1999

[54] TERMINAL DEVICE FOR NETWORK SYSTEM

[75] Inventor: Shingo Itoh, Komaki-shi, Japan

[73] Assignee: Brother Kogyo Kabushiki Kaisha, Aichi-Ken, Japan

[21] Appl. No.: 654,537

[22] Filed: May 29, 1996

[30] Foreign Application Priority Data

Jun. 1, 1995 [JP] Japan .................................. 7-135288

[51] Int. Cl.$^6$ ........................... H04M 1/56; H04M 15/06
[52] U.S. Cl. ...................... 379/142; 379/93.23; 379/373
[58] Field of Search ................................ 379/142, 93.01, 379/93.03, 93.17, 93.23, 247, 252, 354, 373, 396, 421

[56] References Cited

U.S. PATENT DOCUMENTS

| | | | |
|---|---|---|---|
| 4,551,581 | 11/1985 | Doughty | 379/142 |
| 4,582,956 | 4/1986 | Doughty | 379/142 |
| 5,396,548 | 3/1995 | Bayerl et al. | 379/142 |
| 5,452,346 | 9/1995 | Miyamoto | 379/142 |
| 5,467,385 | 11/1995 | Reuben et al. | 379/142 |
| 5,521,969 | 5/1996 | Paulus et al. | 379/142 |

OTHER PUBLICATIONS

Japanese Patent Publication No. HEI 3-74865, published on Nov. 28, 1991.

Primary Examiner—Curtis A. Kuntz
Assistant Examiner—Binh K. Tieu
Attorney, Agent, or Firm—Kane, Dalsimer, Sullivan, Kurucz, Levy, Eisele and Richard, LLP

[57] ABSTRACT

There is provided a terminal device for a network system. The terminal device is capable of receiving a predetermined signal representing a predetermined data which is inserted during a silent period between intermittent ringing signals. The terminal device includes a ringing signal detecting circuit and a signal receiving circuit. The signal receiving circuit is commenced to be ready to receive the predetermined signal upon detection of the ringing signal by the ringing signal detecting circuit.

19 Claims, 5 Drawing Sheets

TERMINAL DEVICE FOR NETWORK SYSTEM

BACKGROUND OF THE INVENTION

The present invention relates to a terminal device such as a telephone or facsimile for a network system in which an information providing service is available, and more particularly to a terminal device which is capable of receiving information provided through a telephone line during a silent period between ringing signals.

Conventionally, a caller-ID system is known as one of information providing services utilizing telephone lines. The caller-ID system is a system for providing certain signal representing information related to a caller during a silent period between intermittent ringing signals. The information signal is added by an exchanger (a switching device) of a telephone network system and transmitted to a terminal device at a receiving station.

The information carried by the caller-ID data may include a date of the call, the telephone number of the caller (calling station), the telephone number of the receiver (receiving station), the name of the caller, the condition of the network system and the like. Various information may be inserted as the caller-ID data in various countries and/or by various central offices which provide similar caller-ID services.

In order to receive the caller-ID data signal which is inserted during the silent period between the ringing signals, it is necessary to make a demodulation method of a modem to correspond to a modulation method for generating the caller-ID data to be received. Generally, an unmodulated mono-frequency signal is added immediately before the caller-ID data as a trigger signal. In the conventional terminal device which is designed to receive the caller-ID data, when the trigger signal, i.e., the unmodulated mono-frequency signal is detected, a data reception procedure of the caller-ID data is started.

In the conventional terminal device as described above, if the line condition is bad and the unmodulated mono-frequency signal may not be detected due to occurrence of noises, it becomes impossible to receive the caller-ID data.

SUMMARY OF THE INVENTION

It is therefore an object of the invention to provide an improved terminal device for a network system capable of receiving a signal representing a caller-ID data even if the unmodulated mono-frequency signal added before the caller-ID data is not detected.

For the above object, according to the present invention, there is provided a terminal device for a network system in which a predetermined signal representing a predetermined data is inserted during a silent period between intermittent ringing signals, the terminal device comprising: detecting means for detecting the ringing signal; receiving means for receiving the predetermined signal; and controlling means for commencing the receiving means to be ready to receive the predetermined signal upon detection of the ringing signal by the detecting means.

Optionally, the predetermined data is related to a caller that made a call at another device to the terminal device. Thus, the terminal device can receive data related to a caller of the outstanding call. Such a network system can be a telephone network system, and the terminal device may be a telephone or a facsimile device.

The predetermined data may include a telephone number of the caller, a name of the caller, a telephone number of the terminal device, and/or data indicating a date and time when the call is made.

The predetermined data may include data indicating that the caller is anonymous, or the call is made at an area where the caller-Id service is not available. In such cases, the predetermined data is added by a telephone switching device of the network system.

Further, the detecting means detects the end of one of the ringing signals which is immediately before the silent period where the predetermined signal is inserted. Therefore, within relatively short period of time, the predetermined signal can be received.

Alternatively, the detecting means detects one of a beginning and an end of a first one of the ringing signals. Even in such a case, since the commencement of the data reception procedure starts with respect to the ringing signal, there is no need to detect a trigger signal which is to be inserted before the predetermined signal carrying the predetermined data.

The silent period where the predetermined signal is inserted can be between the first one and a second one of the ringing signals.

Optionally, the terminal device is provided with means for storing data which is generated by processing the predetermined data.

The receiving means has means for demodulating the predetermined signal, the predetermined data being generated by demodulating the predetermined signal.

Further optionally, the receiving means includes a modem for demodulating the predetermined signal.

Still optionally, the terminal device further includes means for displaying information when the predetermined data is received by the receiving means.

BRIEF DESCRIPTION OF THE ACCOMPANYING DRAWINGS

DESCRIPTION OF THE EMBODIMENT

Figure 1:
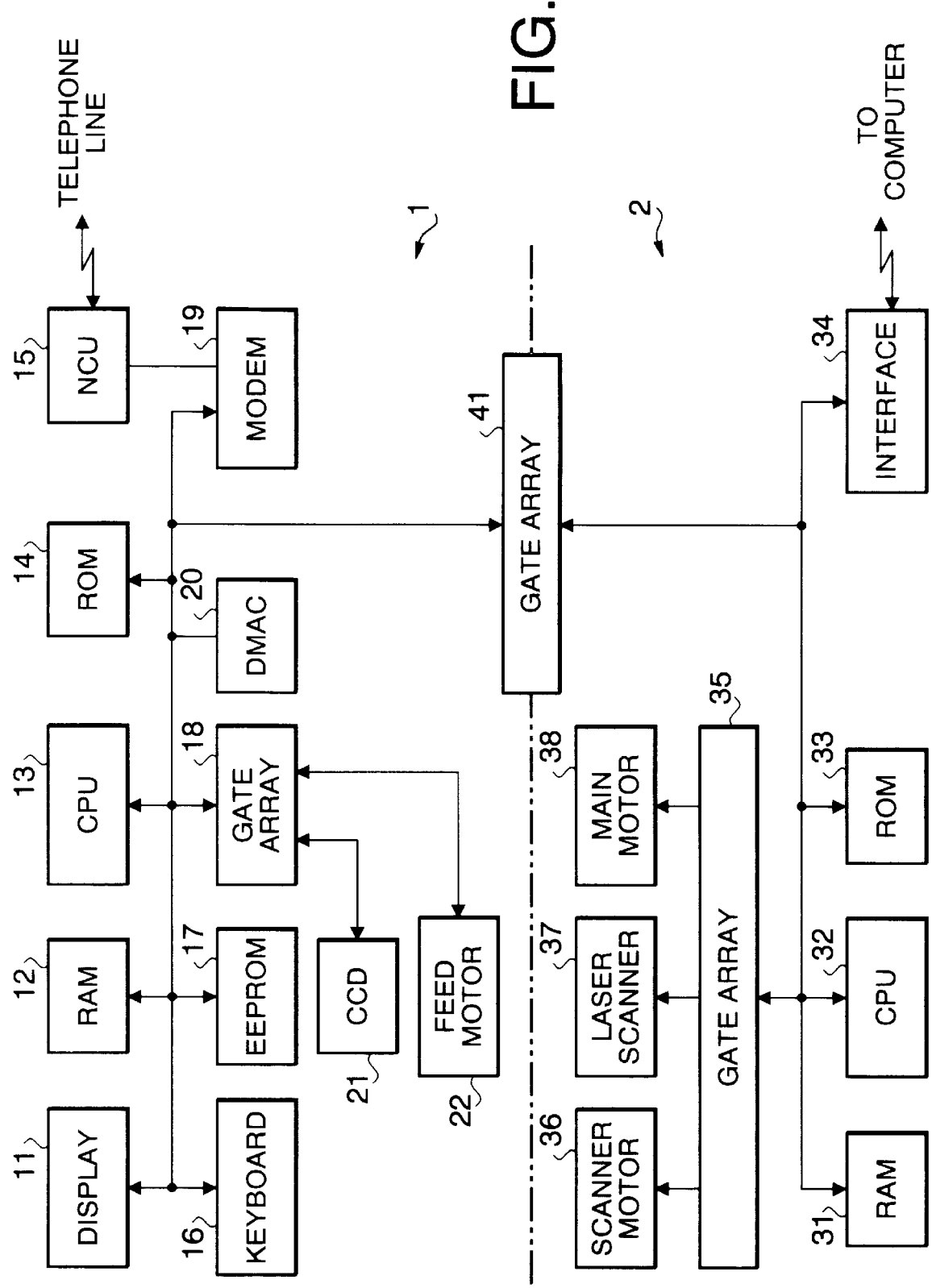
FIG. 1 is a block diagram of a facsimile device as an embodiment of the present invention.

FIG. 1 is a block diagram of a facsimile device as an embodiment of a terminal device of the invention. The facsimile device has a facsimile unit 1 and a printer unit 2.

The facsimile unit 1 has:

- a display 11 having an LCD (Liquid Crystal Display) which is mounted on an operation panel on a casing, not shown, of the facsimile device, and displays various information such as dates and time;
- a RAM 12 for storing various data;
- a CPU 13 for controlling the operation of the facsimile device;
- a ROM 14 for storing various programs and parameters;
- an NCU 15 for controlling connection with a telephone line;

a keyboard 16 which is provided on the operation panel for being operated by an operator to enter commands and/or alphanumerical characters;

an EEPROM 17 for storing a telephone book having a list of names of destinations and their simplified telephone numbers;

a gate array 18;

a MODEM 19 for modulating signals to be transmitted, and for demodulating received signals;

a DMAC 20 for directly transmitting data such as the data stored in RAM 12.

The gate array 18 is connected with a CCD 21 for reading information, and an original feeding motor 22 for feeding originals at a predetermined speed.

The printer unit 2 has:

a RAM 31 for temporarily storing various data;

a CPU 32 for controlling the operation of the printer unit 2;

a ROM 33 for storing various programs to be executed by the CPU 32 and various character patterns;

an interface I/F 34 through which an external devices such as a personal computer can be connected; and a gate array 35 to which a scanner motor 36, a laser scanner 37, a main motor and the like are connected.

The laser scanner 37, which is driven by the scanner motor 36, makes a laser beam to scan for recording image data. Specifically, the laser beam modulated based on an image data to be recorded scan a photoconductive material to form a latent image, the latent image is developed and transferred onto a sheet, and then the transferred image is fixed on the sheet.

The main motor 38 is used for stirring toners and/or feeding sheet. The facsimile unit 1 and the printer unit 2 are connected with each other through a gate array 41 for interface.

The NCU 15 includes a ringing signal detection circuit which detects the end of the ringing signal. Upon detection of the end of the ringing signal by the ringing signal detection circuit of the NCU 15, the CPU 13 commence the modem 19 to be ready to receive a caller-ID data signal carrying the caller-ID data by changing the demodulating method of the modem 19 to a method corresponding to one used for generating (modulating) the caller-ID data signal.

Figure 2:
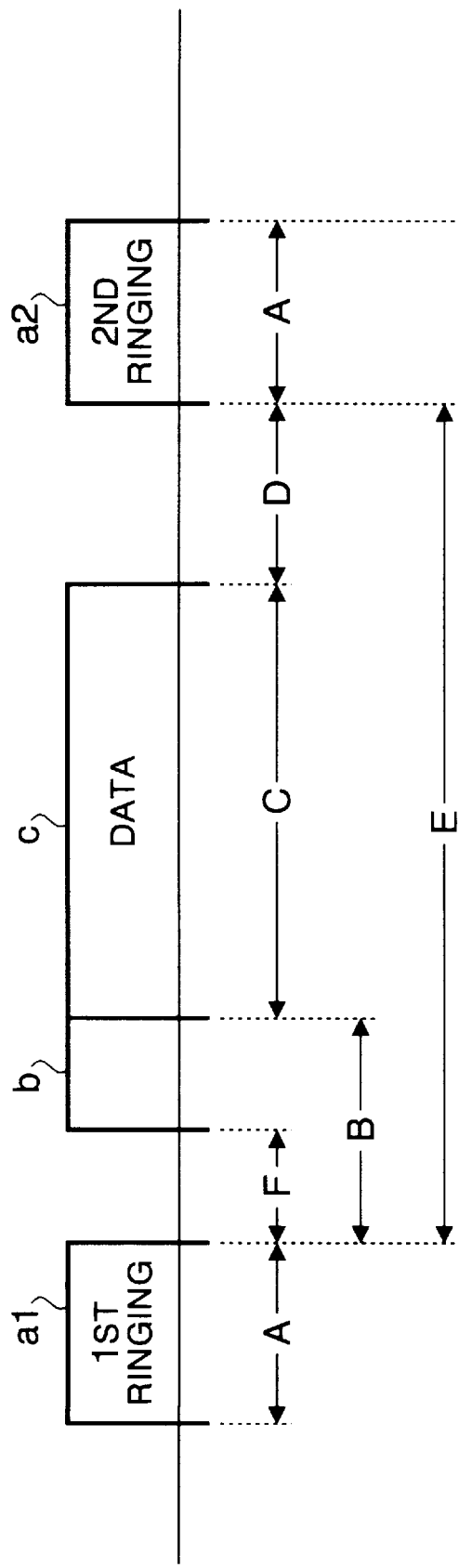
FIG. 2 is a timing chart showing various signals transmitted on telephone line during a ringing period.

FIG. 2 is a timing chart showing various signals transmitted on a telephone line during a ringing period. As shown in FIG. 2, during a silent period between a first ringing signal "a1" and a second ringing signal "a2", an unmodulated mono-frequency signal "b" and the caller-ID data signal "c" are inserted.

The ringing signals "a1" and "a2" have, for example, a 20-hertz, 86-volt RMS sine wave superimposed on −48 DCV. The caller-ID data signal "c" is a so-called frequency shift keyed (FSK) signal having two carrier frequencies such as 2025 and 2225 hertz which respectively represent the low "0" and the high "1" logic levels of a serial data (i.e., the caller-ID information).

In FIG. 2, the duration "A" of each of the first ringing signal "a1" and the second ringing signal "a2" is 2 seconds; the interval "B" between the end of the first ringing signal and the beginning of the caller-ID data signal "c" is equal to or more than 0.5 seconds; the duration "C" of the caller-ID data signal "c" is from 2.9 through 3.3 seconds; the interval "D" between the caller-ID data signal "c" and the beginning of the second ringing signal "a2" is equal to or more than 0.2 seconds; the interval "E" between the end of the first ringing signal "a1" and the beginning of the second ringing signals "a2" is 4 seconds; and the interval "F" between the end of the first ringing signal "a1" and the beginning of the unmodulated mono-frequency signal "b" is 0.3 through 0.35 seconds.

Figure 3:
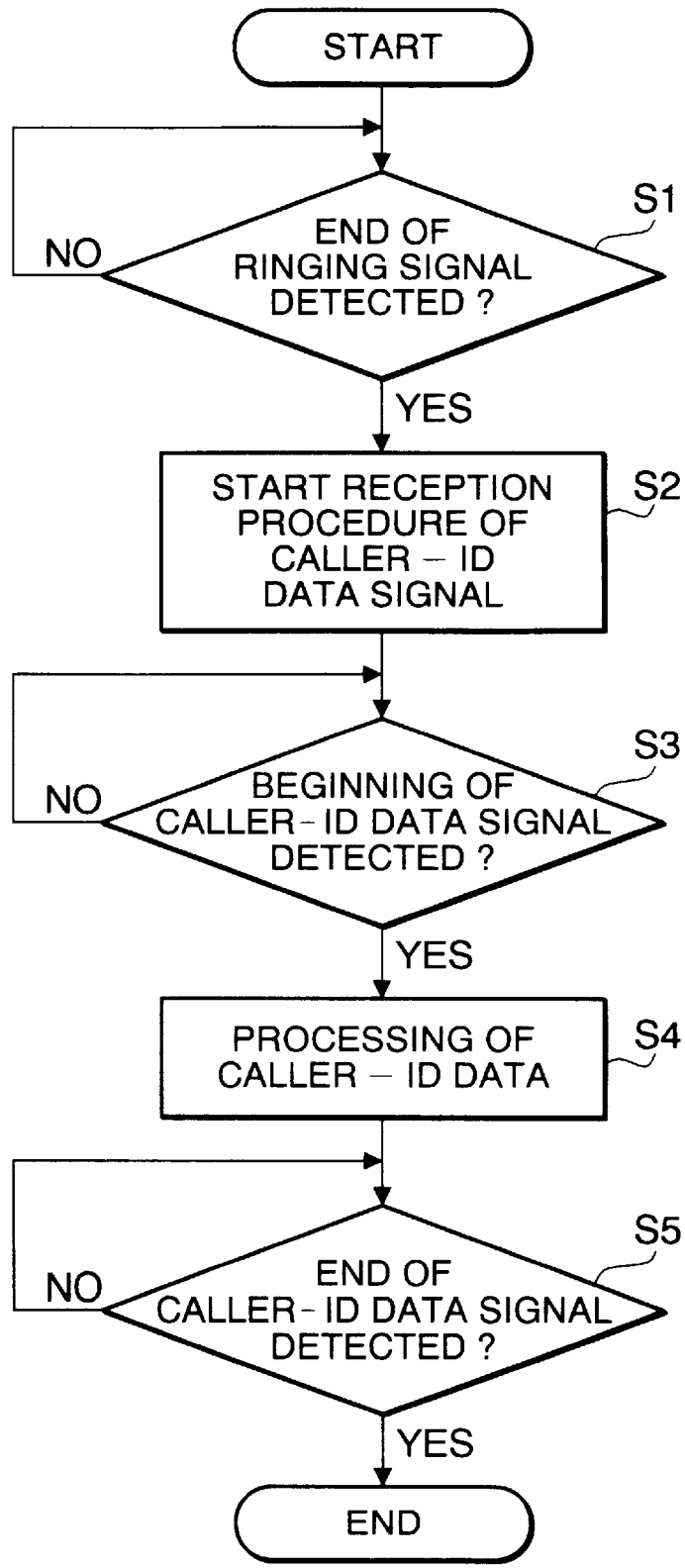
FIG. 3 is a flowchart illustrating a caller-ID data reception procedure.

FIG. 3 is a flowchart illustrating a caller-ID data reception procedure executed in the facsimile device constructed as described above.

When a ringing signal is transmitted from a telephone switching device through a telephone line to the NCU 15, a ringer tone circuit, not shown, generates a ringer tone, and the ringing signal detection circuit of the NCU 15 starts detecting the end of the ringing signal.

Until the end of the ringing signal is detected, i.e., when the ringing signal has not yet transmitted or the detection is made during the ringing period, control stays at step S1.

If the end of the ringing signal is detected (S1:YES), the CPU 13 starts procedure for receiving the caller-ID data signal by changing the demodulation method of the modem 19 to the method corresponding to one used for modulating the caller-ID data signal (S2).

Step S3 determines whether the beginning of the caller-ID data signal (i.e., data c) is received. Until the beginning of the caller-ID data signal is received, control stays at step S3. If the beginning of the caller-ID data signal is received (S3:YES), the CPU 13 starts storing the received caller-ID data in the RAM 12, and perform a predetermined data processing as well as displaying a predetermined information on the display 11 (S4). The information includes data as received and stored in the RAM 12. Therefore, the telephone number of the caller or information related to the caller may be displayed on the display 11.

Until the modem 19 receives the end of the caller-ID data signal (S5:NO), the modem 19 continues to receive the caller-ID data signal, i.e., steps S4 and S5 are repeated. If the modem 19 receives the end of the caller-ID data signal (S5:YES), then the routine shown in FIG. 3 is completed.

Figure 4:
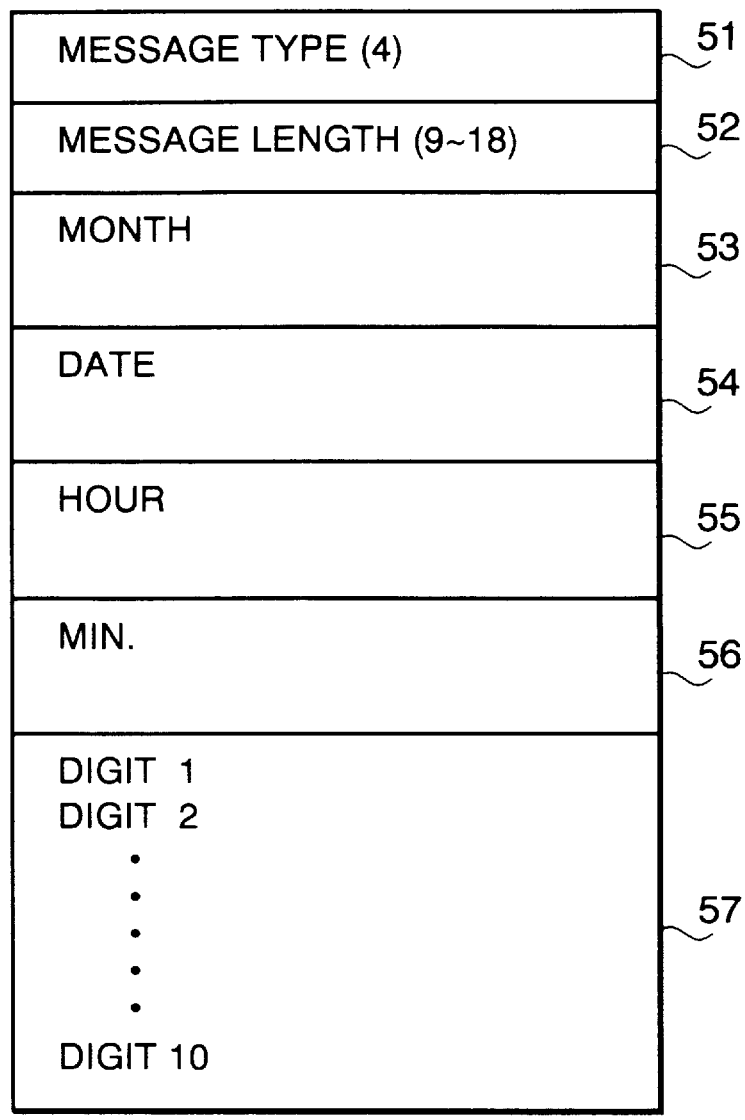
FIG. 4 shows a single data message format of the caller-ID data.
Figure 5:
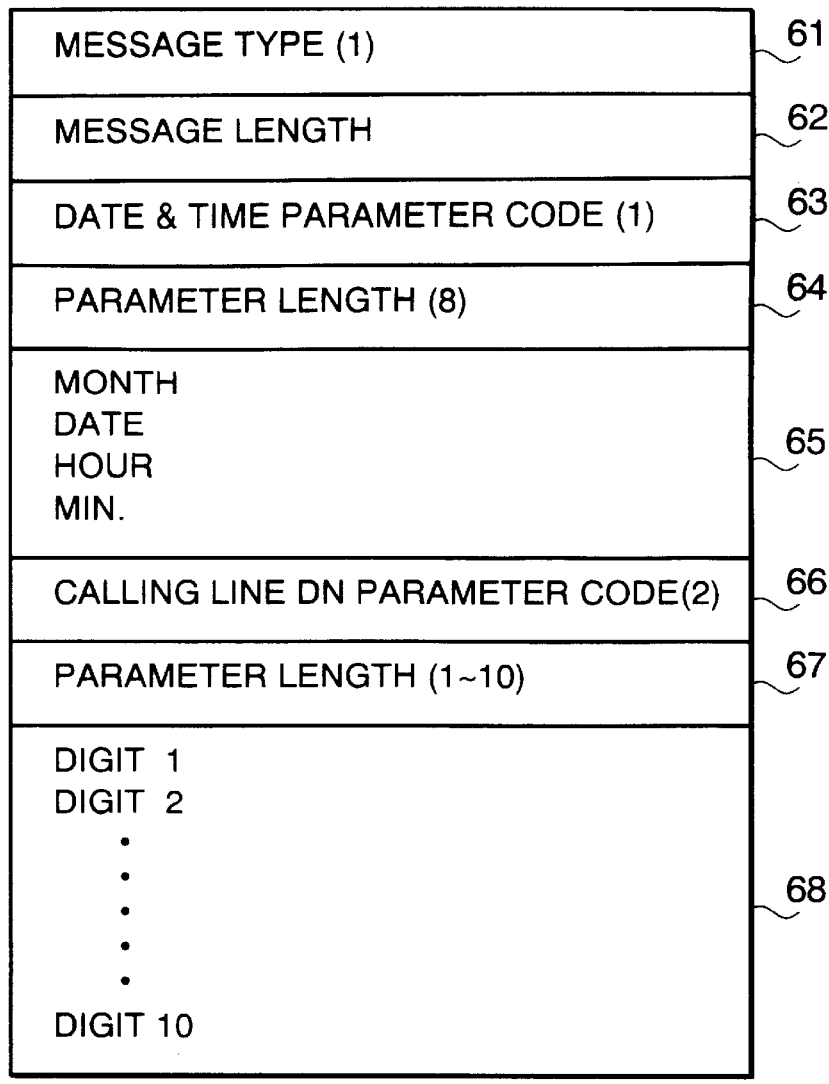
FIG. 5 shows a multiple data message of the caller-ID data.

FIGS. 4 and 5 show typical formats of the caller-ID information. FIG. 4 shows a format of a single data message. The single data message format has areas 51 through 57. The message is contained in the areas 53 through 57. Specifically, the caller-ID data (single data format) has:

the area 51 representing the type of message contained in the area 57, such as a telephone number of the calling station, an alpha-numeric message, the name of the caller, the telephone number of the receiver station, etc.;

the area 52 representing the length of the massage contained in the areas 53 through 57, following the area 52;

the area 53 representing the current month;

the area 54 representing the current date;

the area 55 representing the current time;

the area 56 representing the current minute; and the area 57 representing information related to the caller. In the drawing, as an example, the area 57 represents the telephone number of the caller: digit 1 through digit 10 respectively correspond to the digits of the telephone number of the caller.

Each data stored in the areas 53 through 56 consists of two-byte ASCII codes. Data store in the area 57 is also the ASCII code, and if the code corresponding to letter "P" is stored in the area 53, the caller is anonymous, and if the code corresponding to a letter "O" is stored in the area 53, the call is made at an area where the caller-ID service is not available. The area 57 has ten digits of data storing area (digit 1 through digit 10), each digit is encoded as a 4-bit binary coded decimal character.

FIG. 5 shows a multiple data message format. The multiple data massage format has:

an area 61 representing the type of the message of the caller-ID data; and an area 62 representing the length of the message following the area 62.

The area 61 is used for identify whether the message as transmitted has the format shown in FIG. 4 or shown in FIG. 5.

Further, in the multiple data message format, after the areas 61 and 62, a plurality of sets of three areas are provided. In FIG. 5, the set of areas are (1) areas 63 through 65, and (2) areas 66 through 68. The first area of each set of areas represents data indicating the type of parameters (i.e., data contained in the third area of the set), and the second area of each set represents the length of the parameters (i.e., the third area). In FIG. 5, area 63 indicates that data contained in area 65 is a parameter of date and time; and area 64 indicates the length of the parameter (i.e., area 65). Area 65 indicates the current date and time. Similarly, area 66 indicates that area 68 includes a parameter representing various information related to the caller; and area 67 represents the length of the parameter (i.e., area 68). Area 68 contains the parameter consisting of ten digits of data for representing various information related to the caller. In the area 65 and area 68, data is stored in the form of ASCII codes. It should be noted that there could be more information such as the name of the caller or the like after the area 68.

Figure 6:
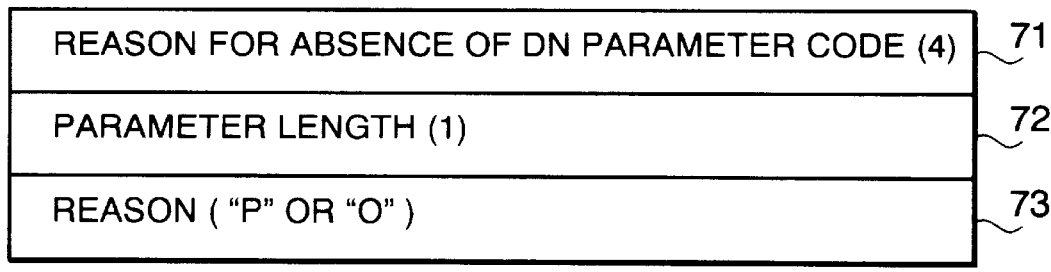
FIG. 6 shows an alternative part of the multiple data message format.

If data corresponding to areas 66 through 68 (i.e., data related to the caller) does not exist, data shown in FIG. 6 is transmitted from the telephone switching device. The data shown in FIG. 6 replaces the areas 66 through 68.

In FIG. 6, an area 71 represents a parameter indicating the reason why there is no data related to the caller, an area 72 represents the length of the parameter, and an area 73 contains data indicating the reason why the data related to the caller does not exist. If data stored in the area 73 corresponds to the letter "P", the caller is anonymous, and if data store in the area 73 corresponds to the letter "O", the call is made at an area where the caller-ID service is not available.

As described above, the CPU 19 commence the modem 19 to be ready to receive the caller-ID data signal (i.e., to start a caller-ID data signal reception procedure) upon detection of the end of the ringing signal by means of the ringing signal detecting circuit in the NCU 15. Therefore, even if the unmodulated mono-frequency signal located before the caller-ID data signal is not detected, the caller-ID data signal can be detected and received safely. The network system which does not use the unmodulated mono-frequency signal "b" but have an information providing function such as the caller-ID system can be constructed if the terminal devices such as facsimile machines and/or telephones is constructed according to the above described embodiment.

Further, since the ringing signal detecting circuit detects the end of the ringing signal "a1" which is located immediately before the silent interval where the caller-ID data signal "c" is inserted, the interval between the start of data reception procedure and actual reception of the caller-ID data is relatively short, and the caller-ID data signal can be securely detected and received without errors.

In the embodiment, the caller-ID data signal is inserted during the silent period between the first and the second ringing signals. It is, however, also possible to construct the network system such that the caller-ID data signal is inserted during the silent period after the second, third, . . . or later ringing signal. In such a case, if the position where the caller-ID data signal is inserted is known, by counting the number of ringing signals and detecting the end of the ringing signal immediately before the silent period where the caller-ID data is inserted, the data reception can be performed successfully. If the position where the caller-ID data signal is inserted is unknown, or even if it is predetermined, by detecting the end of the first ringing signal and controlling the modem to be ready to receive the caller-ID data signal upon detection thereof, it becomes possible to receive the caller-ID data signal without fail. Note that since the frequencies of the ringing signals, the unmodulated mono-frequency signal, and the signal (FSK signal) carrying the caller-ID data are different, they can clearly be distinguished from each other.

In the above-described embodiment, the end of the ringing signal is detected in order to commence the modem to be ready to receive the caller-ID data. The embodiment can be modified such that the beginning of the ringing signal is detected to start reception procedure of the caller-ID data signal.

As described in detail above, according to the invention, since the data receiving procedure of the caller-ID data is started upon detection of the ringing signal, and the unmodulated mono-frequency signal added immediately before the caller-ID data is not used for a trigger signal, even if the unmodulated mono-frequency signal cannot be detected due to noises, the caller-ID data signal can be received successfully. Further, even if the network which does not utilize the unmodulated mono-frequency signal added immediately before the caller-ID data is constructed, the caller-ID data signal can be received without fail.

If the detection of the ringing signal is made with respect to the end of the ringing signal which occurs immediately before the silent period where the caller-ID data signal is inserted, the interval between the detection of the end of the ringing signal and the start of the caller-ID data is relatively short, the possibility of reception errors will be decreased.

The present disclosure relates to subject matter contained in Japanese Patent Application No. HEI 7-135288, filed on Jun. 1, 1995, which is expressly incorporated herein by reference in its entirety.

What is claimed is:

1. A terminal device for a network system in which a predetermined signal representing a predetermined data is inserted during a silent period between intermittent ringing signals, said terminal device comprising:

detecting means for detecting one of a beginning and an end of said ringing signal;

receiving means for receiving said predetermined signal; and controlling means for commencing said receiving means to be ready to receive said predetermined signal upon detection of one of said beginning and said end of said ringing signal by said detecting means.

2. The terminal device according to claim 1, wherein said predetermined data is related to a caller that made a call from another device to said terminal device.

3. The terminal device according to claim 2, wherein said network system comprises a telephone network system.

4. The terminal device according to claim 3, wherein said predetermined data includes a telephone number of said caller.

5. The terminal device according to claim 3, wherein said predetermined data includes a name of said caller.

6. The terminal device according to claim 3, wherein said predetermined data includes a telephone number of said terminal device.

7. The terminal device according to claim 3, wherein said predetermined data includes data indicating that said caller is anonymous.

8. The terminal device according to claim 7, wherein said data indicating that said caller is anonymous is added by a switching device of said network system.

9. The terminal device according to claim 3, wherein said predetermined data includes data indicating that said call is made at an area where said predetermined signal is not inserted.

10. The terminal device according to claim 9, wherein said data indicating that said call is made at an area where said predetermined data is not inserted is added by a switching device of said network system.

11. The terminal device according to claim 1, wherein said predetermined data includes data indicating a date and time when a call is made.

12. The terminal device according to claim 1, wherein said detecting means detects the end of one of said ringing signals immediately before said silent period where said predetermined signal is inserted.

13. The terminal device according to claim 1, wherein said detecting means detects said one of said beginning and said end of a first one of said ringing signals.

14. The terminal device according to claim 13, wherein said silent period is between said first one and a second one of said ringing signals.

15. The terminal device according to claim 1, further comprising means for storing data which is generated by processing said predetermined data.

16. The terminal device according to claim 15, wherein said receiving means comprises means for demodulating said predetermined signal, said predetermined data being generated by demodulating said predetermined signal.

17. The terminal device according to claim 16, wherein said receiving means comprises a modem for demodulating said predetermined signal.

18. The terminal device according to claim 1, further comprising means for displaying a predetermined information when said predetermined data is received by said receiving means.

19. The terminal device according to claim 1, wherein said controlling means commences said receiving means to be ready to receive said predetermined signal before said predetermined signal appears.

* * * * *